March 6, 1962  H. A. GURNEY ET AL  3,023,954
CALCULATING DEVICE

Filed Sept. 26, 1957  2 Sheets-Sheet 1

INVENTORS
HARLAN A. GURNEY
MOREL D. GUYOT
BY *Elliott & Pastoriza*
ATTORNEYS

INVENTORS
HARLAN A. GURNEY
MOREL D. GUYOT
BY *Elliott & Pastoriza*
ATTORNEYS

United States Patent Office 3,023,954
Patented Mar. 6, 1962

3,023,954
CALCULATING DEVICE
Harlan A. Gurney, 4532 Natoma Ave., Woodland Hills, Calif., and Morel D. Guyot, 3585 Beverly Glen Blvd., Sherman Oaks, Calif.
Filed Sept. 26, 1957, Ser. No. 686,440
4 Claims. (Cl. 235—84)

This invention relates generally to calculating devices, and more particularly to an improved manually operable slide rule computer for use in aircraft.

In aircraft operation, the pilot may always determine at a glance the indicated air speed, the indicated temperature, and the altitude of the aircraft. By indicated air speed and indicated temperature is meant the actual instrument readings observed on the control panel of the aircraft. Neither of these figures, however, accurately indicate the true air speed and true temperature.

Conventional air speed indicators basically consist of a pressure gauge positioned on the aircraft in the air stream and responsive to the impact or dynamic pressure of the air resulting from the speed of the plane through the air. The gauge itself is calibrated to read in terms of air speed. Impact pressure, however, is a function of the air density as well as speed. For calibrating the indicators, the air density at a standard sea level pressure of 29.92" Hg and standard temperature of 15° C. is used.

As the speed of an aircraft increases, the impact pressure acting on the measuring instrument is increased by two factors: first, the pressure increases according to the square of the speed; and, second, the pressure is additionally increased as a consequence of adiabatic expansion resulting from compression heating of the air at the mouth of the instrument. Both of these factors are non-linear.

Since changes in both altitude and temperature result in changes in the air density and changes in speed result in changes in the above noted impact and compressibility effects, correction factors must be applied to the indicated air speed by a pilot during flight to determine the true air speed.

An aircraft thermometer is calibrated to read air temperature under static conditions. During flight, such thermometer will indicate the static temperature plus an increase in temperature due to adiabatic heating as a consequence of impact compression. This additional heating is also in part a function of whether the air flow is laminar or turbulent at the thermometer bulb. Since the impact pressure is a function of speed, it is evident that the indicated temperature will also depend on the air speed.

If an aircraft is provided with a Mach meter, the particular altitude of the aircraft is of no consequence in the computing of true air speed from true temperature inasmuch as the Mach number designation itself is a function of air density and thus altitude.

While the rather complicated formulas relating the above variables together have been worked out in detail and, if properly applied, will enable the determination of true air speed and true temperature from given values of the indicated air speed, temperature, and altitude, the calculations are time consuming and laborious. Slide rules have been employed in the past to simplify these operations, but several settings are usually necessary and a rapid determination of the desired quantities still takes considerable time and is subject to cumulative errors in the successive settings.

Bearing the above in mind, it is a primary object of the present invention to provide a novel slide rule type computer which will indicate the true air speed with only a single setting regardless of whether the speed is subsonic, sonic, or supersonic.

Another object is to provide an improved calculating device of the above type in which the chances of making errors are minimized.

More particularly, it is an object of the invention to provide a calculating device which will yield the true air speed, true air temperature, and Mach number for sub-sonic speeds by means of only a single setting, and which will also yield the true air speed for supersonic flight with only a single setting, the necessary relationships for both sub-sonic and supersonic conditions being combined in a single calculating device.

These and many other objects and advantages of the present invention are attained, briefly, by providing a stationary disc having first and second scales inscribed about circumferential portions of the disc, each of these scales including curved lines extending inwardly from the respective adjacent peripheral edges towards the central portion of the disc. A movable disc is co-axially mounted to the stationary disc and provided with a peripheral edge divided into first and second spirals constituting mirror images of each other with respect to a plane passing diametrically and normally through the movable disc. The respective spiral edges have inscribed thereon a logarithmic scale arranged to be positioned juxtaposed the two scales on the stationary disc.

As a consequence of the spiral peripheral edge construction of the movable disc, rotation of this disc will cause a variable eclipsing of lengths of the curved lines on the scales of the stationary disc in such a manner that each of the numbers on the logarithmic scale of the movable disc are capable of representing dual numbers on either one of the scales of the stationary disc. One of these dual numbers is designated by following that curved line which intersects the number on the peripheral edge of the adjacent spiral to the particular number on the scale associated with the curved line and the other of the dual numbers is indicated by that number on the scale which falls in radial alignment with said point of intersection and number on the spiral edge. The provision of the various inwardly curved lines associated with the scales on the stationary disc co-operating with the variable eclipsing of lengths thereof by the spiraling edges of the movable disc, enables the compressibility effects resulting in adiabatic heating to be automatically incorporated in the computations and thus enables the desired calculations to be made by only a single setting of the movable disc with respect to the stationary disc.

A further feature of the dual spiral construction for the movable disc is the total eclipsing of one of the scales on the stationary disc when supersonic calculations are to be made whereby there is substantially no possibility of committing an error with respect to the totally eclipsed scale. Further, the spirals are so designed that upon the total eclipsing of the one scale for supersonic flight calculations, the other scale on the stationary disc is disconnected with respect to the adjacent spiral edge there being a blank marginal area between the termination of the curved scale lines and the spiral edge so that there is substantially no possibility of accidentally establishing any relationships between the particular spiral edge and these curved lines.

A better understanding of the improved calculating device of this invention will be had by referring to the accompanying drawings in conjunction with the following detailed description, in which.

Figure 1:
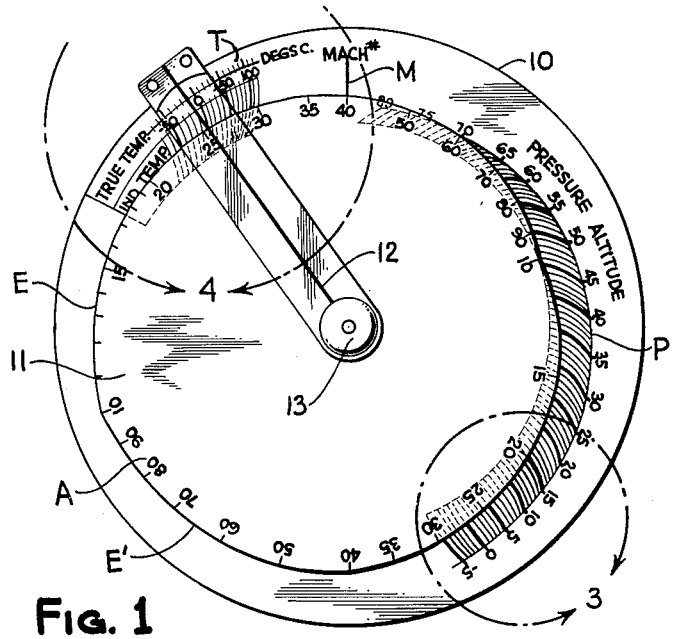
FIGURE 1 is a front plan view illustrating the basic components of the computer of this invention set in a first position for yielding certain sub-sonic flight information.

Referring first to FIGURE 1, the basic components of the calculating device comprise a stationary disc 10 and a movable disc 11. A cursor defining a radial line 12 may also be provided. These three elements are co-axially mounted for rotation with respect to each other by means of a hub shaft 13.

As shown in FIGURE 1, the stationary disc 10 includes a pressure-altitude scale circumferentially extending about a portion of the periphery of the stationary disc as indicated at P. This pressure-altitude scale includes a series of curved lines extending from numerals adjacent the peripheral edge of the disc 10 inwardly towards the central portion of the disc. The numerals designate the altitude in thousands of feet.

Also provided on the stationary disc 10 is a temperature scale T circumferentially spaced with respect to the pressure-altitude scale P and also including several curved lines extending inwardly towards the central portion of the disc from numbers indicating the temperature in degrees centigrade. At the center top portion of the disc 10, there is provided a radial Mach number indexing line M.

The movable disc 11 is unique in that its entire peripheral edge is defined by a pair of spirals E and E'. These spirals are mirror images of each other with respect to a plane passing normally to the drawing through the central hub 13 as shown, and include a two cycle logarithmic scale A designating air speed in units of ten knots. The same numerals, with proper shifting of the decimal point, are employed to indicate Mach numbers with respect to the Mach indexing line M on the stationary disc 10.

Figure 2:
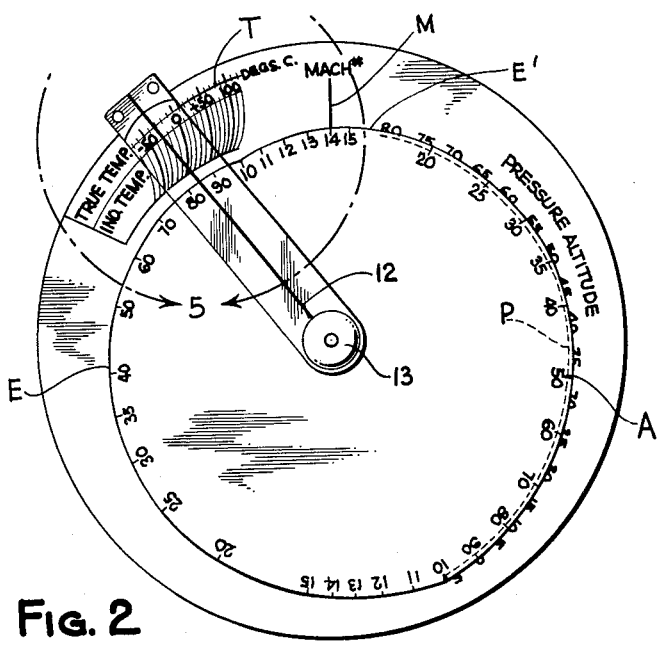
FIGURE 2 is a view similar to FIGURE 1 illustrating a second setting of the elements of the computer for making a supersonic flight calculation.

As a consequence of the spiral shape of the peripheral edges E and E' as defined with respect to the center hub of rotation 13, rotation of the movable disc 11 results in a variable eclipsing of lengths of the various curved lines associated with the P scale and T scale. This variable eclipsing is effected when the movable disc 11 is rotated clockwise such as indicated in FIGURE 1 from an initial position in which the intersection of the inner ends of the two spirals defining a dimple, is in alignment with the Mach number indexing line M, to that position illustrated in FIGURE 1. On the other hand, if the movable disc 11 is rotated in a counter clockwise direction, or alternatively rotated clockwise substantially around a three-quarter circle, the spiral construction of its peripheral edges causes a complete eclipsing of the P scale by the E' spiral edge and a removal from registration with the T scale of the E spiral edge whereby the lower marginal portion beyond the ends of the curved lines of the T scale is exposed and thus no eclipsing co-operation between the spiral edge E and the T scale is possible. As will become clearer as the description proceeds, this relative orientation as illustrated in FIGURE 2 is employed when calculations are being made under conditions of supersonic flight.

The cursor indexing line 12 is arranged to extend rectilinearly directly from the center of rotation for the various discs to the outside periphery thereof and enables radial alignment of certain of the air speed numerals on the scale A with respect to numerals on the scales P and T. In this connection, it should be noted that any single setting of the movable disc 11 with respect to the scales on the stationary disc 10 such as illustrated in FIGURE 1 will enable each of the air speed numbers juxtaposed the curved lines on the P and T scales to indicate dual values on these scales. This dual indication is a consequence of the curved lines extending from the various numerals to intersect the spiral edges of the movable disc and the fact that these curved lines with the exception of the zero line on the P scale are not in radial alignment with the cursor indexing line 12 when the latter is positioned thereover. In other words, the point where the curved line intersects the spiral edge of the movable disc 11 will designate one of the numbers on the scale on the stationary disc 10 by following the curve up to the number, whereas the corresponding position of the cursor radial indexing line 12 on the scale when positioned over the same numeral on the movable disc 11 will designate a different numeral on the scale.

Figure 3:
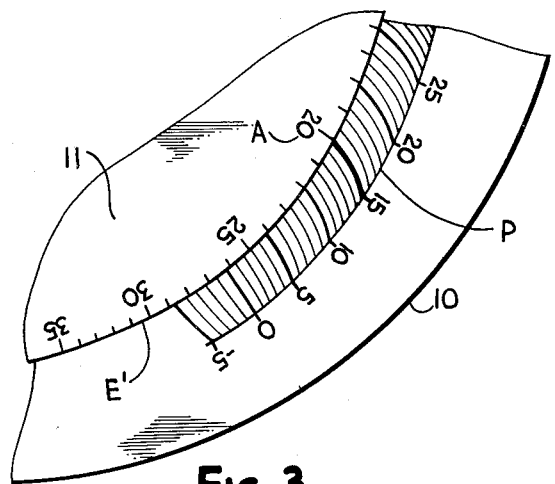
FIGURE 3 is a greatly enlarged fragmentary view of the portion of the scales enclosed within the circular arrow 3 of FIGURE 1.

A clearer understanding of the meaning of the scales and the manner in which the computer provides the desired indications will best be understood by referring to the following specific example:

Assume first that an aircraft is traveling under sub-sonic conditions at an altitude of 15,000 feet and an indicated air speed of 200 knots. Further assume that under these conditions there is indicated an ambient temperature of zero degrees centigrade. The problem presented is to determine under these conditions the true air speed, the true air temperature, and the Mach number. To solve this problem, the speed of 200 knots as represented by the numeral 20 on the A scale of the movable disc 11 is positioned such that it is intersected by the curved line on the pressure altitude P scale extending inwardly from the numeral 15, indicating 15,000 feet pressure altitude. This particular setting is illustrated in the enlarged view of FIGURE 3 wherein it will be noted that the numeral 20 on the A scale is intersected at the spiral edge of the movable disc 11 by the curved line extending from the numeral 15 on the P scale.

To determine the true air speed, reference is now had to that portion of the spiral curve E eclipsing the various curved lines on the temperature scale T and particularly the point where the indicated curved line extending from the indicated temperature of zero degrees intersects the spiral edge E. Referring to the enlarged view of FIGURE 4, it will be noted that for the zero degrees centigrade indicated temperature, the curved line intersects the spiral edge E and thus the air speed scale A at an air speed of approximately 254 knots. Thus, the true air speed is 254 knots when the ambient indicated temperature is zero degrees centigrade. To determine the true temperature, the radial indexing line 12 of the cursor is positioned to intersect the true air speed value of 254 knots and the true temperature is then read from the top portion of the T scale. As indicated, this true temperature is −7° C.

Figure 4:
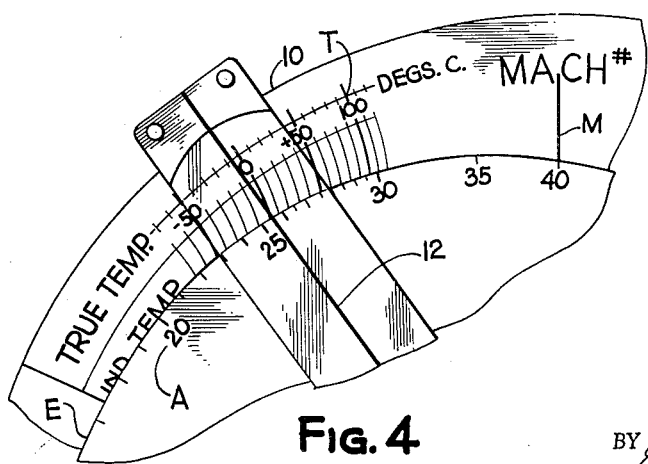
FIGURE 4 is another enlarged view of a portion of the scales enclosed within the circular arrow 4 of FIGURE 1; and, FIGURE 5 is another fragmentary view illustrating portions of the scales enclosed within the circular arrow 5 of FIGURE 2.

Finally, a corresponding Mach number for the indicated speed of 200 knots and 15,000 feet pressure altitude is provided by observing the point on the spiral edge E of the scale A juxtaposed the Mach number index line M. As shown in FIGURE 4, the numeral juxtaposed the index line M on the scale A is 40 indicating a Mach number of .4.

From the description given with respect to FIGURE 4, it will become immediately evident that dual numerals or quantities are represented by a single intersection of one of the spiral edges with one of the curved lines such as in the specific example of the zero degrees indicated temperature. In this case, the curved line associated with 0° C., constituting one of the dual numbers, intersects the spiral edge at 254, while the true temperature true of —7° C., being the other of the dual numbers, is intersected by the radial indexing line of the cursor 12 when this line is aligned with the true air speed of 254 knots.

Referring now to FIGURE 2, it will be noted that the movable disc 11 is positioned such that the pressure-altitude scale P is completely eclipsed while the temperature scale T is wholly separated from the spiral edges of the movable disc such that there is no possibility of inadvertently positioning the wrong numerals on the A scale with respect to the pressure altitude scale during a sub-sonic flight calculation.

Figure 5:
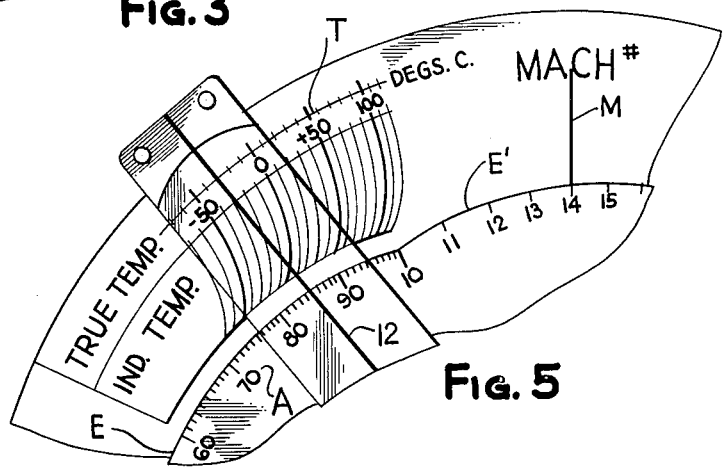

In the computation of true air speed in supersonic flight, the Mach number is determinable from the Mach meter. The true temperature is obtained from forecasts or properly corrected indicated temperatures at sub-sonic flight at the same altitude. The pressure-altitude and indicated temperature scales are of no consequence at supersonic speeds. Thus, taking a specific example, assume that the aircraft is traveling at an indicated Mach number of 1.4 and that the true air temperature is —30° C. The problem is to determine the true air speed. To this end, the movable disc 11 is positioned such that the spiral edge E' intersects the Mach indexing line M at the point where the numeral 14 is juxtaposed the indexing line as indicated in the enlarged view of FIGURE 5. In this position, the cursor 12 is then aligned with the true temperature of —30°. The point on the movable disc 11 intersected by the cursor line 12 then marks the particular numeral on the A scale indicating the true air speed. In the example illustrated in FIGURE 5, this true air speed is 849 knots.

From the foregoing description, it will be evident that the present invention provides a novel computing device which requires but a single setting for yielding true air speeds under both sub-sonic and supersonic conditions. Further, the device may be employed to convert knots into Mach numbers at sub-sonic speeds for given altitudes as already explained in connection with FIGURES 3 and 4.

It will also be evident that conventional circular type slide rule elements may be combined with the two discs illustrated in FIGURES 1 and 2. For example, the movable disc 11 may also be provided with a circular scale extending at a constant radial distance from the center point but spaced radially inwardly from the logarithmic scale. This circular scale may co-operate with an additional conventional circular disc positioned on the hub 13. Further, the other side of the stationary disc 10 may include scales and smaller additional circular discs for computing vector directions and other conventional numerical magnitudes convenient for safe aircraft operation. These additive features have not been shown since they are well known in the art. Further, while the invention has been described particularly with respect to computing true air speeds and true temperatures, it will be immediately evident that the novel configuration of dual spirals co-operating with scales incorporating inwardly curved lines adapted to be eclipsed, will enable solutions of other problems to be readily computed by only single settings.

Accordingly, the invention is not to be thought of as limited to the particular application chosen for illustrative purposes.

What is claimed is:

1. A calculating device comprising: a stationary disc having a first scale inscribed about a circumferential portion of said disc, said scale including curved lines extending inwardly from the adjacent peripheral edge of said disc towards the central portion thereof; a second scale inscribed about a circumferential portion spaced from said first mentioned circumferential portion and including curved lines extending inwardly from the adjacent peripheral edge of the disc towards the central portion thereof; and a movable disc rotatably mounted to said stationary disc and having a pair of spirals defined thereon comprising mirror images of each other with respect to a plane normal to and including the axis of said movable disc, each of said spirals including numbers constituting a logarithmic scale, said respective spirals being adapted to divide said curved lines into variable lengths respectively upon rotation of said movable disc whereby each of said numbers may be positioned to indicate dual values on each of said first and second scales corresponding respectively to the particular scale values assigned to those curved lines which intersect the particular numbers on the respective spirals and the particular scale values which fall in radial alignment with said numbers.

2. A calculating device comprising: a stationary disc having a first scale inscribed about a circumferential portion of said disc, said scale including curved lines extending inwardly from the adjacent peripheral edge of said disc towards the central portion thereof; a second scale inscribed about a circumferential portion spaced from said first mentioned circumferential portion and including curved lines extending inwardly from the adjacent peripheral edge of the disc towards the central portion thereof; and a movable disc rotatably mounted to said stationary disc and having a pair of spirals defined thereon comprising mirror images of each other with respect to a plane normal to and including the axis of said movable disc, each of said spirals including numbers constituting a logarithmic scale, said movable disc being opaque from its center outward to said spirals so that said respective spirals are adapted to respectively eclipse portions of the curved lines associated with said first and second scales on said stationary disc upon rotation of the movable disc whereby each of said numbers may be positioned to indicate dual values on each of said first and second scales corresponding respectively to the particular scale values assigned to those curved lines which intersect the particular numbers on the respective spirals and the particular scale values which fall in radial alignment with said numbers.

3. A calculating device for indicating true air speed, true air temperature, and Mach number at sub-sonic speeds and for indicating true air speed at supersonic speeds comprising, in combination: a stationary disc having a pressure-altitude scale inscribed about a circumferential portion of said disc, said scale including curved lines extending inwardly of the peripheral edge of said disc from pressure-altitude designating numerals, said disc also including a true temperature scale inscribed about a circumferential portion of said disc circumferentially spaced from said pressure-altitude scale, said true temperature scale including curved lines extending inwardly of the adjacent peripheral edge of said disc from true temperature designating numerals; a movable disc co-axially mounted for rotation to said stationary disc and having an opaque surface portion, the peripheral edge of said opaque surface portion being defined by first and second spiral portions with respect to the center of rotation of said movable disc; and a cursor having a radial indexing line mounted for rotation with respect to both said stationary disc and said movable disc, said spiral portions of said movable disc having a logarithmic air speed scale inscribed thereon, whereby rotating said movable disc in one direction results in a variable eclipsing of said curved lines by said spiral portions for yielding sub-sonic information, and moving said movable disc in an opposite direction completely eclipses said pressure altitude scale and completely exposes marginal areas beyond the ends of said true temperature scale whereby neither of the curved lines of said latter scales are usable in co-operation with said spiral portions and only said cursor relates numerals on said true temperature scale with numerals on said air speed scale.

4. A calculating device according to claim 3, in which said stationary scale includes a single Mach number indexing line positioned thereon with respect to said pressure-altitude and temperature scales to indicate on said logarithmic air speed scale of said movable disc, the correct Mach number for a predetermined air speed setting.

References Cited in the file of this patent

UNITED STATES PATENTS

| | | |
|---|---|---|
| 7,961 | Nystrom | Mar. 4, 1851 |
| 2,064,917 | Jensen | Dec. 22, 1936 |
| 2,416,772 | Reece | Mar. 4, 1947 |
| 2,597,609 | Bartlett | May 20, 1952 |
| 2,767,919 | Huber | Oct. 23, 1956 |
| 2,853,236 | Culbertson | Sept. 23, 1958 |

FOREIGN PATENTS

| | | |
|---|---|---|
| 537,788 | France | Mar. 9, 1922 |